United States Patent [19]

Zernik

[11] Patent Number: 5,383,120
[45] Date of Patent: Jan. 17, 1995

[54] METHOD FOR TAGGING COLLOCATIONS IN TEXT

[75] Inventor: Uri Zernik, Schenectady, N.Y.

[73] Assignee: General Electric Company, Schenectady, N.Y.

[21] Appl. No.: 844,026

[22] Filed: Mar. 2, 1992

[51] Int. Cl.$^6$ ............................................. G06F 15/38
[52] U.S. Cl. ................................................ 364/419.08
[58] Field of Search ................................ 395/2, 2.66; 364/419.02, 419.08, 419.07

[56] References Cited

U.S. PATENT DOCUMENTS

| | | | |
|---|---|---|---|
| 4,868,750 | 9/1989 | Kucera et al. | 364/419.08 |
| 4,942,526 | 7/1990 | Okajima et al. | 364/419.08 |
| 4,947,438 | 8/1990 | Paeseler | 395/2.66 |
| 5,128,865 | 7/1992 | Sadler | 364/419.02 |
| 5,146,405 | 9/1992 | Church | 364/419.08 |
| 5,181,163 | 1/1993 | Nakajima et al. | 364/419.08 |
| 5,230,037 | 7/1993 | Giustiniani et al. | 395/2 |
| 5,251,129 | 10/1993 | Jacobs et al. | 364/419.08 |

Primary Examiner—David D. Knepper
Attorney, Agent, or Firm—David C. Goldman; Paul R. Webb, II

[57] ABSTRACT

A technique for injecting corpus-based preference into syntactic text parsing is provided. Specifically, the problem of tagging content-word pairs by part-of-speech is solved by using thematic analysis. A new measure of the fixed or variable nature of such word pairs is created and used to classify word pairs as either noun-verb, adjective-noun, or verb-noun.

4 Claims, 1 Drawing Sheet

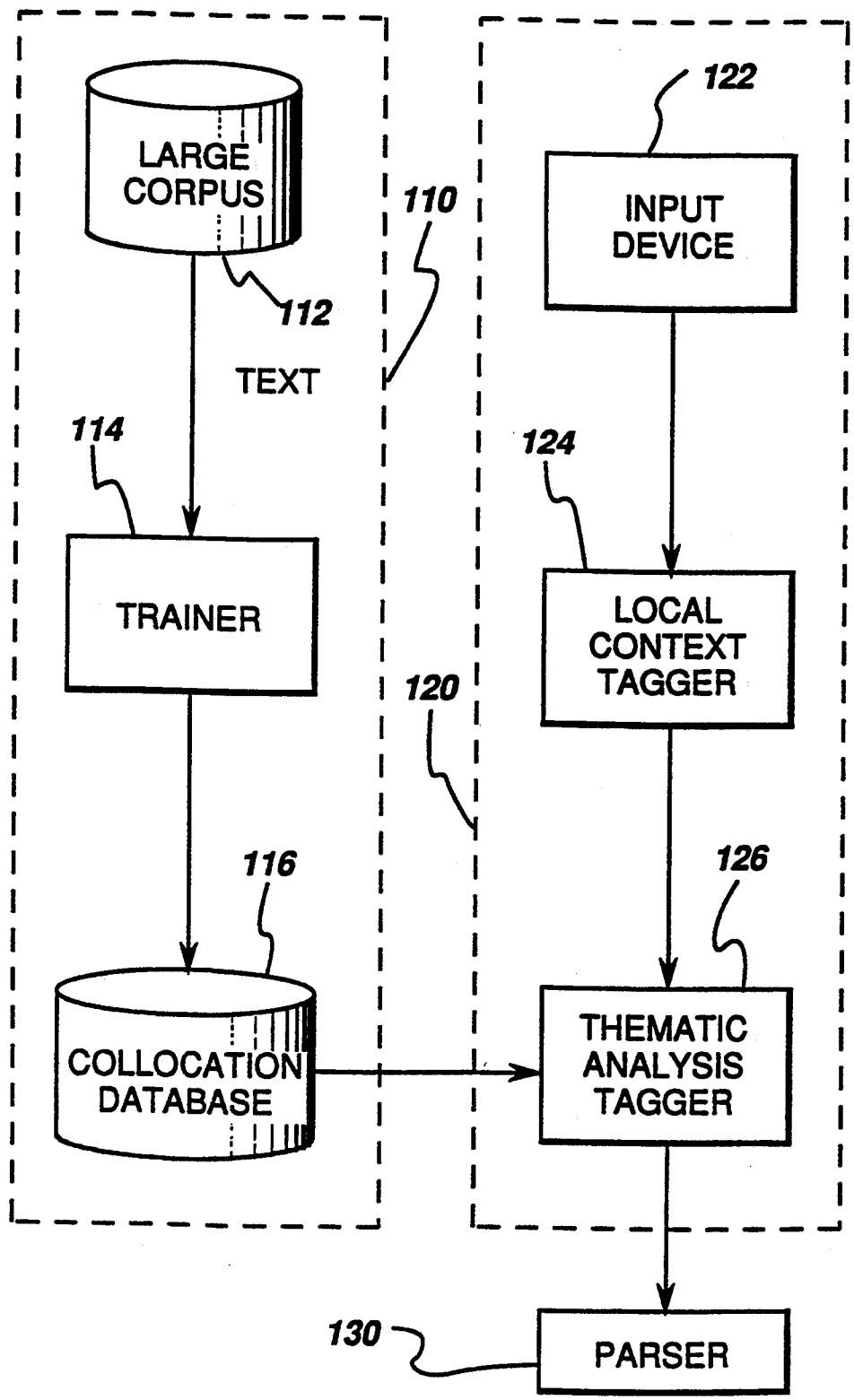

METHOD FOR TAGGING COLLOCATIONS IN TEXT

BACKGROUND OF THE INVENTION

Sentences in a typical newspaper story include idioms, ellipses, and ungrammatical constructs. Since authentic language defies text-book grammar, the basic parsing paradigm must be tuned to the nature of the text under analysis.

Hypothetically, parsing could be performed by one huge unification mechanism as described in the literature: S. Schieber, "At Introduction to Unification-based Approaches to Grammar", Center for the Study of Language and Information, Palo Alto, Calif., 1986 and M. Tomita, "Efficient Parsing for Natural Language", Lluwer Academic Publishers, Hingham, Mass., 1986. Such a mechanism would receive its tokens in the form of words, characters, or morphemes, negotiate all given constraints, and produce a full chart with all possible interpretations.

However, when tested on a real corpus, (i.e., Wall Street Journal (WSJ) news stories), this mechanism collapses. For a typical well-behaved 33-word sentence it produces hundreds of candidate interpretations.

To alleviate problems associated with processing real text, a new strategy has emerged. A preprocessor, capitalizing on statistical data has been described in the literature: K. Church, W. Gale, P. Hanks, and D. Hindle, "Parsing, Word Associations, and Predicate-Argument Relations", Proceedings of the International Workshop on Parsing Technologies, Carnegie Mellon University, 1989 and I. Dagan, A. Itai, and U. Schwall, "Two Languages are More Informative Than One", Proceedings of the 29th Annual Meeting of the Association for Computational Linguistics, Berkeley, Calif., 1991. Such a processor is trained to exploit properties of the corpus itself, highlights regularities, identifies thematic relations, and in general, feeds digested text into the unification parser.

Consider the following WSJ, (Aug. 19, 1987) paragraph processed by a preprocessor:

Separately, Kaneb Services spokesman/nn said/vb holders/nn of its Class A preferred/jj stock/nn failed/vb to elect two directors to the company/nn board/nn when the annual/jj meeting/nn resumed/vb Tuesday because there are questions as to the validity of the proxies/nn submitted/vb for review by the group.

The company/nn adjourned/vb its annual/jj meeting/nn May 12 to allow/vb time/nn for negotiations and expressed/vb concern/nn ab out future/jj actions/nn by preferred/jj holders/nn.

The problem which the present invention is intended to solve is the classification of content-word pairs into one of the following three categories.

| 1. | and | expressed/VB concern/NN | about |
| 2. | Services | spokesman/NN said/VB | holders |
| 3. | class A | preferred/JJ stock/NN | *comma* |

The constructs expressed concern and spokesman said must be tagged verb-object and noun-verb respectively. Preferred stock, on the other hand, must be identified and tagged as a fixed adjective-noun construct.

The complex scope of the pre-processing task is best illustrated by the input to the preprocessor shown below.

| Kaneb | NM | Services | NN VB | spokesman | NN |
| said | JJ VB | holders | NN | of | PP |
| its | DT | Class | JJ NN | A | DT JJ |
| preferred | JJ VB | stock | NN VB | failed | AD VB |
| to | PP | elect | VB | two | JJ NN |
| directors | NN | to | PP | the | DT |
| company | NN | board | NN VB | when | CC |
| annual | JJ | meeting | NN VB | resumed | JJ VB |
| tuesday | NM | questions | NN VB | validity | NN |
| proxies | NN | submitted | JJ VB | group | NN VB |

This lexical analysis of the sentence is based on the Collins on-line dictionary plus morphology. Each word is associated with candidate parts of speech, and almost all words .are ambiguous. The tagger's task is to resolve the ambiguity.

A program can bring to bear 3 types of clues in resolving part-of-speech ambiguity. The first is local context. Consider the following 2 cases where local context dominates:

1. the preferred stock raised
2. he expressed concern about

The words the and he dictate that preferred and expressed are adjective and verb respectively. This kind of inference, due to its local nature, is captured and propagated by the preprocessor.

The second clue is global context. Global-sentence constraints are shown by the following two examples:

1. and preferred stock sold yesterday was . . .
2. and expressed concern about . . . *period*

In case 1, a main verb is found (i.e., was), and preferred is taken as an adjective; in case 2, a main verb is not found, and therefore expressed itself is taken as the main verb. This kind of ambiguity requires full-fledged unification, and it is not handled by the preprocessor. Fortunately, only a small percent of the cases (in newspaper stories) depend on global reading. The third type of due is corpus analysis and is described in R. Beckwith, "Wordnet: A Lexical Database Organized in Psycholinguistic Principles" in Lexical Acquisition: Exploiting On-Line Dictionary to Build a Lexicon, Lawrence Erlbaum Assoc., 1991.

SUMMARY OF THE INVENTION

In accordance with the present invention, a method is provided for performing part of speech tagging for content-word pairs in a natural language text processing system. Content-word pairs are first identified in a large corpus of text used for training purposes. For each word pair identified, a variability factor is calculated. This variability factor is a measure of the variability of the form that the particular word pair takes in the training text. A database of all of the content-word pairs and their associated variability factors is created for use by a program which performs tagging of a body of text. This database provides additional information in the form of the variability factors which can be used in conjunction with other known tagging methods such as local context analysis.

In another embodiment of the present invention, a mutual information score is used to control which word pairs occurring in the training text are to be stored in the database.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawing, in which:

The sole FIGURE is a schematic diagram which shows the elements of the present invention.

DESCRIPTION OF THE INVENTION

The focus of the present invention is on how to exploit the preferences encountered in corpus analysis using thematic analysis (analysis of word relationships).

Referring now to FIG. 1, there is shown a corpus of text 112 to be used for training. Trainer 114 is a computer program which reads corpus 112 and creates collocation database 116 using an algorithm which is described below. Once collocation database 116 is in place the actual tagging process may begin. An input device 122 is used for entering text to be tagged. The text is first processed by local context tagger 124 which uses local context rules to tag words. When no rule applies for tagging a word, then the word is tagged "??" (meaning "untagged"). When local context tagging is completed, the text is next processed by thematic analysis tagger 126. Thematic analysis tagger 126 uses database 116 to tag the word-pairs left untagged by tagger 124. Word pairs are either tagged as fixed collocations or thematic relations depending on a variable factor associated with the word pair in the database. Parser 130 is standard text parsing software which accepts as input the marked up text as processed according to the method just described.

1. If a word pair is a collocation (e.g., holding companies), and one of the two words is tagged "??",
   then generate the S-stripped version (i.e., holding company), and the affix-stripped version (i.e., hold company).
2. Look up database.
   (a) If neither collocation is found, then do nothing.
   (b) if only affix-stripped collocation is found, or if VF (variability factor) is smaller than threshold, then tag first word a verb and the second word a noun;
   (c) if VF is larger than threshold, then tag adjective-noun or noun-noun (depending on lexical properties of word, i.e., running vs. meeting).

Checking for the noun-verb case is symmetrical (in step 2.b). The threshold is different for each suffix and should be determined experimentally (initial threshold can be taken as 0.75.

Notice that local-context rules override corpus preference. Thus, although preferred stocks is a fixed construct, in a case such as John preferred stocks, the algorithm will identify preferred as a verb. Upon completion of thematic analysis tagging, the text is in condition to be passed to parser 130 which performs parsing on the tagged text.

The algorithm yields incorrect results in two problematic cases.

The first is ambiguous thematic relations which are collocations that entertain both subject-verb and verb-object relations, i.e., selling-companies (as in "the company sold its subsidiary . . . " and "he sold companies . . . ").

The second is interference between coinciding collocations such as: market-experience and marketing-experience, or ship-agent and shipping-agent. Fortunately, these cases are very infrequent.

Adjectives and nouns are difficult to distinguish in raw corpus (unless they are marked as such lexically). For example, since the lexicon marks light as both adjective and noun, there is no visible difference in the corpus between light/JJ beer and light/NN bulb. The present algorithm tags both light cases as a noun.

The example below illustrates the use of a fixed and a variable collocation in context, and motivates the need for thematic analysis. In this small sample, 8 out of 35 cases (the ones marked "-") cannot be resolved reliably by using local context only. Without using thematic analysis, a tagger will produce arbitrary tags for taking and operating.

---

• latest version of the UNIX V operating system softwate and some −
th Microsoft 's MS *slash* DDS operating system *period* Microsoft −
ties obtained licenses for the operating system *period* With the +
nths before IBM can provide an operating system that taps its mach +
*comma* much as Microsoft 's operating system software is now th +
r *colon* eta systems inc. its operating system has not been debug +
cyber uses an unusual internal operating system *s-colon* to sell +
*hyphen* Telegraph Co. 's UNIX operating system *comma* fast becom −
willing to suffer with a crude operating system *period*        +
at someday the Macintosh II 's operating system would be enhanced +
phen* compatible computers and operating systems has created an op −
allow the equity investors to take advantage of federal tax benef +
spect that some countries will take advantage of the option to pay +
*comma* probably will want to take advantage of an option such as +
scheduling *comma* some might take advantage of the opportunity t +
ed that rotated 360 degrees to take advantage of the view *period* +
th cheap local deposits and by taking advantage of its low overhea −
ins by nimbly trading zeros to take advantage of short *hyphen* to +
dexes and futures contracts to take advantage of various differenc +
itional financing *s-colon* to take advantage of future business o +
pendent publishers *comma* and take advantage of our considerable +
olon* but if brazil decides to take advantage of any price rally * +
that some practical jokers had taken advantage of the offer *dash* +
onent systems on time *period* Taking advantage of changing demogr −
ravel plans by a few months to take advantage of the low fares *pe +
tic producers can successfully take advantage of the tax to eke on +
ing lobbyists and scurrying to take advantage of the current hosti +
homeowner 's refinancing to take advantage of lower interest ra +
g complete pc systems *period* Taking advantage of their lower *hy −
rally came from investors who took advantage of rising stock pric +

-continued

```
n part by investors rushing to take advantage of britain 's high c +
*comma* stayed long enough to take advantage of the amenities tha +
ber of institutional investors took advantage of the rally to roll +
mma* mo *period* Companies are taking advantage of that to rebuild +
for example *dash* *dash* have taken advantage of the strong yen t +
```

Existing statistical taggers which rely on bigrams or trigram, but which do not employ thematic analysis of individual collocations fare poorly on this linguistic aspect.

A database of collocations must be put in place in order to perform thematic analysis. Ideally, the database is acquired by counting frequencies over a tagged corpus. However, a sufficiently large tagged corpus is not available. To acquire an adequate database of collocations, the full 85-million WSJ corpus is needed. It is necessary to infer the nature of combinations from indirect corpus-based statistics as shown below.

The basic linguistic intuition of the present invention is presented below.

Training over the corpus requires inflectional morphology (analysis of word roots). For each collocation P the following formula is applied to calculate P's Variability Factor (assume the collocation P is produced cars):

$$VF(P) = \frac{fW(\text{plural}(P)) + fW(\text{singular}(P))}{fR(\text{stemmed}(P))}$$

$VF(\text{produced} - \text{cars}) =$ $$\frac{fW(\text{produced} - \text{cars}) + fW(\text{produced} - \text{car})}{fR(\text{produce} - \text{car})} =$$

$$\frac{2 + 9}{2 + 9 + 5 + 4 + 13 + 17 + 2} = \frac{11}{52} = 0.21$$

| | | | Verb-Noun Relations | | |
|---|---|---|---|---|---|
| 2 | produced-car | 387 | expressed-concern | 72 | taken-advantage |
| 9 | produced-cars | 25 | expressed-concerns | 22 | takes-advantage |
| 5 | produces-cars | 10 | expresses-concern | 995 | take-advantage |
| 4 | produce-car | 31 | expressing-concern | 2 | take-advantages |
| 13 | produce-cars | 3 | expressing-concerns | 260 | taking-advantage |
| 17 | producing-cars | 33 | express-concern | 159 | took-advantage |
| 2 | production-cars | | | | |
| | | | Noun-Verb Relations | | |
| 947 | companies-said | 118 | analysts-note | 51 | spokesman-acknowledged |
| 242 | companies-say | 192 | analysts-noted | 8 | spokesman-acknowledges |
| 13 | companies-saying | 192 | analysts-noted | 2 | spokesman-acknowledging |
| 135 | companies-says | 13 | analysts-noting | | |
| 14146 | company-said | 79 | analyst-noted | | |
| 43 | company-say | 6 | analyst-notes | | |
| 20 | company-saying | 6 | analyst-notes | | |
| 698 | company-says | 6 | analyst-notes | | |
| | | 9 | analyst-noting | | |
| | | | Adjective-Noun Constructs | | |
| 3491 | joint-venture | 3558 | preferred-stock | 2 | operates-systems |
| 807 | joint-ventures | 11 | preferred-stocks | 627 | operating-system |
| 2 | joint-venturing | | | 86 | operating-systems |
| | | | | 2 | operational-systems |
| | | | | 2 | operates-system |

Frequencies of each variant in the WSJ corpus are shown. For example, joint venture takes 3 variants totaling 4300 instances, out of which 4288 are concentrated in 2 patterns, which in effect (stripping the plural "S" suffix), are a single pattern. For produce car no single pattern holds more than 21% of the cases. Thus, when more than 90% of the phrases are concentrated in a single pattern, it is classified as a fixed adjective-noun (or noun-noun) phrase. Otherwise, it is classified as a noun-verb (or verb-noun) thematic relation.

Where fW (plural (P)) means the word frequency of the plural form of the collocation; fW (singular(P)) means the frequency of the singular form of the collocation; fR (stemmed (P)) means the frequency of the stemmed collocation.

Accordingly, VF (producing-car)=VF (producing-cars)=0.32; and VF (produce-car) is (by coincidence) 0.32. In contrast, VF (joint-venture) is 1.00. A list of the first 38 content-word pairs encountered in a test corpus is shown below.

| VF(P) | P | fW(P) | stemmed(P) | fR(st'd(P)) | MIS(P) |
|---|---|---|---|---|---|
| 1.00 | business-brief | 10083 | business-brief | 10083 | 9.95 |
| 1.00 | joint-ventures | 4298 | joint-venture | 4300 | 12.11 |
| 1.00 | aggregates-operation | 9 | aggregate-operation | 9 | 5.84 |
| 0.56 | produce-concrete | 5 | produce-concrete | 9 | 4.59 |
| 1.00 | crushed-stones | 12 | crush-stone | 12 | 11.08 |
| 0.00 | forming-ventures | 0 | form-venture | 44 | 5.50 |
| 0.00 | leases-equipment | 0 | lease-equipment | 12 | 4.35 |
| 1.00 | composite-trading | 10629 | composite trade | 10629 | 9.41 |
| 1.00 | related-equipment | 65 | relate-equipment | 65 | 5.28 |
| 0.17 | taking-advantage | 260 | take-advantage | 1510 | 9.25 |
| 0.99 | electronics-concern | 482 | electronic-concern | 485 | 6.87 |

-continued

| VF(P) | P | fW(P) | stemmed(P) | fR(st'd(P)) | MIS(P) |
|---|---|---|---|---|---|
| 1.00 | work-force | 2014 | work-force | 2014 | 7.79 |
| 0.00 | beginning-operation | 0 | begin-operation | 160 | 4.11 |
| 1.00 | makes-additives | 5 | make-additive | 5 | 4.39 |
| 1.00 | lubricating-additive | 4 | lubricate-additive | 4 | 14.66 |
| 0.18 | showed-signs | 62 | show-sign | 339 | 6.28 |
| 1.00 | telephone exchange | 66 | telephone-exchange | 66 | 5.56 |
| 0.95 | holding-company | 7752 | hold-company | 8124 | 6.21 |
| 1.00 | phone-equipment | 51 | phone-equipment | 51 | 6.02 |
| 1.00 | phone companies | 572 | phone-company | 572 | 5.56 |
| 0.93 | venture-partner | 140 | venture-partner | 150 | 6.17 |
| 0.26 | report-net | 283 | report-net | 1072 | 6.10 |
| 1.00 | net-income | 9759 | net-income | 9759 | 10.54 |
| 1.00 | home-appliance | 96 | home-appliance | 96 | 11.01 |
| 0.99 | brand-name | 683 | brand-name | 687 | 8.98 |
| 0.96 | product-lines | 965 | product-line | 1009 | 7.12 |
| 1.00 | equity-stake | 266 | equity-stake | 266 | 6.65 |
| 1.00 | earning-asset | 46 | earn asset | 46 | 4.46 |
| 1.00 | problem-loans | 252 | problem-loan | 252 | 5.10 |
| 0.86 | finance-specialists | 30 | finance-specialist | 35 | 5.06 |
| 1.00 | finished-products | 93 | finish-product | 93 | 5.79 |
| 1.00 | mining ventures | 18 | mine-venture | 18 | 5.03 |
| 1.00 | gas-industry | 154 | gas-industry | 154 | 5.05 |
| 0.18 | began-talks | 27 | begin-talk | 152 | 4.56 |
| 0.55 | produce-electricity | 27 | produce-electricity | 49 | 6.14 |
| 1.00 | power-plants | 1353 | power-plant | 1353 | 8.12 |
| 1.00 | oil-heating | 14 | oil-heat | 14 | 4.01 |
| 0.97 | contract-dispute | 187 | contract-dispute | 193 | 6.64 |

The frequency of each collocation P in the corpus relative to its stem frequency is shown. The ratio, called VF, is given in the first column. The second and third columns present the collocation and its frequency. The fourth and fifth column present the stemmed collocation and its frequency. The sixth column presents the mutual information score (MIS). The MIS is calculated by dividing the number of occurrences of the collocation by the number of times each individual word in the collocation occurs alone. During training, collocations with MIS values below a selected threshold may be ignored.

Notice that fixed collocations are easily distinguishable from thematic relations. The smallest VF of a fixed collocation has a VF of 0.86 (finance specialist); the largest VF of a thematic relation is 0.56 (produce concrete). Thus, a threshold, say 0.75, can effectively be established.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A method for performing thematic part-of-speech tagging for collocations having content-word pairs in a natural language text processing system comprising the steps of:

identifying collocations of content-word pairs in a large corpus of text;

calculating, for each of said collocation content-word pair identified, a variability factor which is a measure of variability of said collocation content-word pairs occurring in said text;

storing said collocation content word pairs and associated variability factors in a collocation database; and using said database to tag collocation content-word pairs according to said variability factors, wherein collocation content-word pairs with high variability factors are tagged as having a verb and a noun thereat and collocation content-word pairs with low variability factors are tagged as having an adjective and a noun thereat or a noun and noun thereat.

2. The method of claim 1 wherein a collocation content-word pair and associated variability factor are stored in said database when the mutual information score for said collocation content-word pair is above a selected threshold.

3. The method of claim 1 wherein said high variability factors exceed 0.75 and said low variability factors are less than or equal to 0.75.

4. The method of claim 1 comprising the additional step of using local context analysis to tag collocation content word pairs before using said collocation database.

* * * * *